J. BURGE.
Sugar Mill.
No. 24,440.
Patented June 21, 1859.
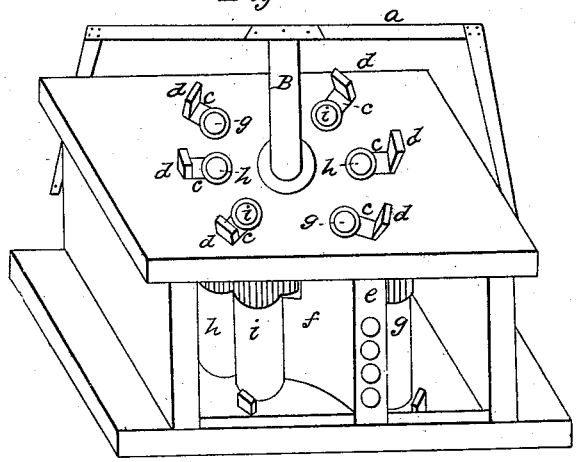
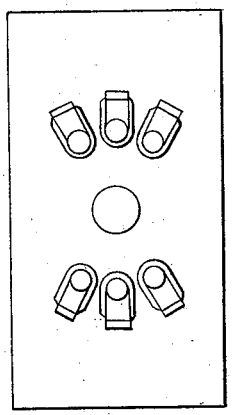
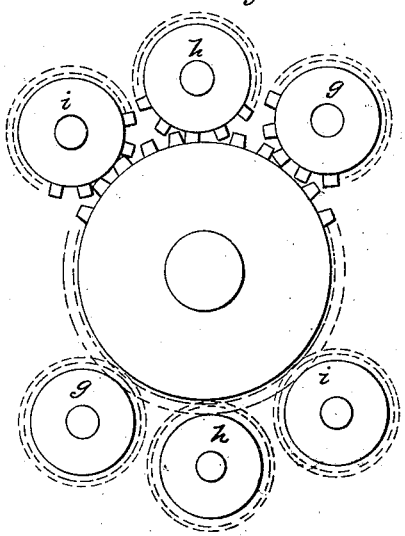
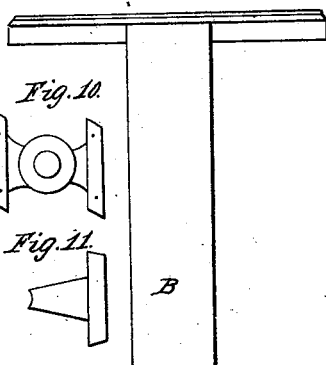
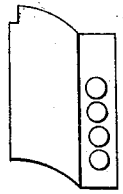
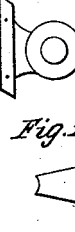
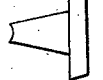
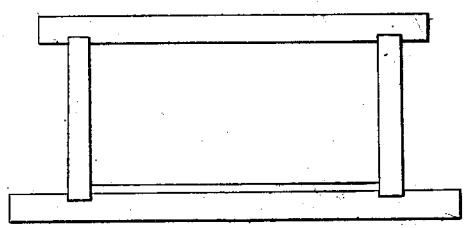
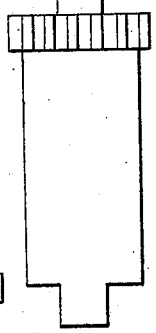
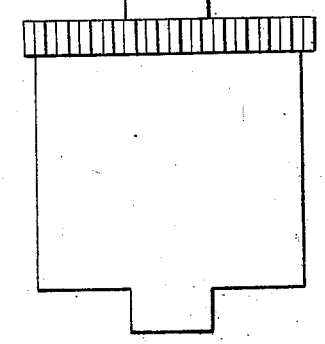

UNITED STATES PATENT OFFICE.

JOHN BURGE, OF TERRE HAUTE, INDIANA.

IMPROVEMENT IN SUGAR-MILLS.

Specification forming part of Letters Patent No. 24,440, dated June 21, 1859.

*To all whom it may concern:*

Be it known that I, JOHN BURGE, of Terre Haute, in the county of Vigo and State of Indiana, have invented a new and useful Machine for Pressing the Chinese Sugar-Cane, entitled the "Farmers' Sugar-Mill;" and I do hereby declare that the following is a full, clear, and exact description of the construction and operation of the same, reference being had to the annexed drawings, making a part of this specification, in which—

Figure 1 is a perspective view; Fig. 2, a view of the combination of cylinders; Fig. 3, a view of the top of the frame with boxes; Fig. 4, a view of box; Fig. 5, a view of key for moving the boxes; Fig. 6, a front view of frame; Fig. 7, feed-bar and scraper; Fig. 8, a large cylinder; Fig. 9, small cylinder; Fig. 10, front view of stripper; Fig. 11, side view of stripper.

To enable others skilled in the art to make and use my machine, I will proceed to describe its construction and operation.

The frame is made of wood, as shown in Figs. 1, 3, and 6 in the drawings, and is not so liable to break as if made of iron, besides being lighter to handle. The cylinders are made of iron, stand upright, as shown in drawings, Figs. 2 and 1, composed of one large cylinder and six small ones—three on each side. The power is applied to the large cylinder by means of the sweep *a*, Fig. 1, attached to the shaft B. The large cylinder turns the small cylinders by means of cogs, (shown in Fig. 2,) each small cylinder depending on the large cylinder for motion, and acting independently of the other cylinders. The journals of the cylinders work in cast-iron boxes (shown in Fig. 3, also Fig. 1) *c c c c c c*, and held fast in their places by the keys *d d d d d d*. To the feed-bar *e* is attached a scraper, *f*, for cleaning the large cylinder and turning the waste cane out of the way of the person feeding. To the feed-bar is also attached a stripper, (shown in Figs. 10 and 11,) which is composed of two pieces of steel (bent in the form of a tube) working in together, one end being a little smaller than the other. The smallest end of the cane is fed into the small end of the stripper, which expands enough to allow the cane to pass through, stripping off the leaves, thereby saving a great deal of trouble and expense. The drawings represent a double mill, requiring two horses to propel it and two men to feed it—one standing each side. By means of the keys and boxes the small cylinders can be set tight to the large cylinder, or a short distance from it. The cane passes through the feed-bar and stripper, in between the feed-cylinders *g g*, Figs. 1 and 2, and the large cylinder, feed-cylinders being set so as to crush the cane, but not to press it very dry. The next cylinders *h h* press it a little harder, but not very dry, while the last cylinders, *i i*, finish it, the juice escaping through the bottom of the mill into some receptacle set for the purpose.

What I claim as my invention, and desire to secure by Letters Patent, is—

The combination and arrangement of one large and two or more small cylinders, with the stripper for stripping the leaves off the cane, and the scraper or separator for cleaning the cylinder and carring off pressed cane, the whole constructed and operating as and for the purpose substantially as described.

JOHN BURGE.

Witnesses:
ALBERT GRAY,
WM. P. BURGE.